United States Patent
Op de Laak

(10) Patent No.: US 7,914,727 B2
(45) Date of Patent: Mar. 29, 2011

(54) METHOD AND DEVICE FOR PRODUCING A PLASTIC COMPONENT WITH AN INTERNAL HOLLOW SPACE

(76) Inventor: Marcel Op de Laak, Freiburg (DE)

(*) Notice: Subject to any disclaimer, the term of this patent is extended or adjusted under 35 U.S.C. 154(b) by 1789 days.

(21) Appl. No.: 10/922,349

(22) Filed: Aug. 20, 2004

(65) Prior Publication Data
US 2005/0046091 A1 Mar. 3, 2005

(30) Foreign Application Priority Data
Aug. 29, 2003 (DE) .................. 103 39 859

(51) Int. Cl.
*B29C 49/06* (2006.01)
*B29C 49/66* (2006.01)
(52) U.S. Cl. .... 264/572; 264/237; 264/544; 264/328.12
(58) Field of Classification Search .................. None
See application file for complete search history.

(56) References Cited

U.S. PATENT DOCUMENTS

| 4,129,635 | A | | 12/1978 | Yasuike et al. |
| 5,098,637 | A | | 3/1992 | Hendry |
| 5,505,891 | A | * | 4/1996 | Shah ............................ 264/28 |
| 5,798,080 | A | * | 8/1998 | Ogura et al. ................ 264/572 |
| 6,579,489 | B1 | | 6/2003 | Thomas |
| 6,716,387 | B2 | * | 4/2004 | Thomas ...................... 264/572 |
| 6,896,844 | B2 | * | 5/2005 | Thomas ...................... 264/570 |

* cited by examiner

*Primary Examiner* — Monica A Huson
(74) *Attorney, Agent, or Firm* — Volpe and Koenig, PC

(57) ABSTRACT

For producing a plastic component (2) with an internal hollow space (3), at first plastic is injection molded into an injection mold (4) and its cavity (6) and then for displacing the plastic melt from the internal hollow space (3) to be formed, gas under pressure is injected into the still liquid plastic melt, after which for cooling the plastic, a cooling liquid is also introduced into this internal hollow space (3). So that this cooling can be performed as quickly as possibly, the gas is compressed with the help of the cooling liquid and inserted or injected into the plastic melt, so that the cooling liquid directly follows the gas, wherein it can already extend into the internal hollow space (3) before this space is completely formed by the gas, i.e., gas and cooling liquid can be present simultaneously in the internal hollow space (3) to be formed.

15 Claims, 8 Drawing Sheets

METHOD AND DEVICE FOR PRODUCING A PLASTIC COMPONENT WITH AN INTERNAL HOLLOW SPACE

BACKGROUND

The invention relates to a method for producing a plastic component with an internal hollow space, wherein at first plastic is injected into an injection mold, gas is then introduced into the liquid plastic melt to displace the melt from the internal hollow space to be formed under pressure, and then for cooling the plastic, a liquid is introduced into the internal hollow space.

The invention further relates to a device for producing a plastic component with an internal hollow space using an injection mold, which can be connected to an injection-molding machine and which has a connection for introducing gas for displacing melt from the internal hollow space to be formed in the component and for introducing a cooling liquid, especially water.

A similar method and a device of this general type are known from DE 199 29 700 A1. According to this known method, at first after the injection mold is filled with the plastic material or the plastic melt, a gas volume is introduced through an inlet opening for forming the hollow space, whereby this gas volume is discharged again from the hollow space by means of a different opening. Thus, this gas must be introduced at a sufficient pressure, i.e., a corresponding device for generating the gas pressure is required to inject the gas into the injection mold.

In this known method, after the gas is discharged, at first the inlet opening is made larger in terms of its flow cross section to allow the cooling liquid to be introduced at a regulated pressure and/or volume. Thus, the cooling liquid also requires a corresponding feeding or pressure device, thus it requires relatively large machine expense.

In addition, there is no way to stop the still plastic mass located in the interior of the injection mold from beginning to flow due to the influence of gravity during the time between when the gas is discharged and the cooling liquid is introduced. Thus, it is possible that in this intermediate time before the cooling liquid takes effect, the internal hollow space of the component could change in an undesired way.

SUMMARY

Therefore, there is the object of creating a method and also a device of the type mentioned in the introduction, whereby the machine expense and the risk of undesired changes in the internal hollow space of the component made from plastic taking place can be lessened.

To achieve this task, the method according to the invention includes the gas is injected into the plastic melt with the help of the cooling liquid. To form the internal hollow space, the gas is not pressurized and introduced with a stand-alone feeding device, but instead the gas is brought to the required pressure with the help of the cooling liquid, which guarantees that the cooling liquid penetrates into the internal hollow space at least partially created shortly before by the gas, while the gas is still located in a part of this hollow space and is possibly even still forming this space. Thus, there is practically no time loss between the creation of the internal hollow space and the beginning of its cooling, so that undesired changes of the internal hollow space, especially deformations due to uncontrolled melt flow, can be prevented. In addition, the machine expense is reduced, because the feeding device for the cooling liquid can also be used for supplying the gas.

In addition, the size of the inlet cross section does not have to change, because gas and liquid enter into the injection mold or into the melt one after the other in direct succession through this inlet opening.

In this way, the method according to the invention, in which the gas forming the internal hollow space is set under pressure by the cooling liquid and is fed into the component, can be applied to a wide variety of methods for producing such components. For example, it can be applied when the injection mold is filled only partially with melt and this is then distributed in the mold with the help of the gas to form the internal hollow space, which is also known as top blowing. However, any other procedure for forming an internal hollow space with the help of a gas within a plastic melt can be applied in this way according to the invention, wherein every procedure has the significant advantage that first, no separate feeding device is required for supplying the gas and second, most importantly, the cooling can begin as fast as possible.

Here, it is preferable when the gas is brought to the introduction pressure in a pre-chamber of smaller cross section located before the injection mold in the direction of flow by means of the cooling liquid and then is introduced into the injection mold and the melt located therein. Thus, the gas can fulfill its task of forming the internal hollow space with a corresponding pressure and the cooling liquid follows immediately, so that between the formation of the hollow space and the cooling, practically no time remains for the melt to begin flowing in an undesired way.

The gas can be filled into a tubular or hose-like pre-chamber connected to an injector for introducing the gas and the liquid into the injection mold in measured amounts and if necessary under high pressure and liquid can be supplied or fed to the end of the tubular or hose-like pre-chamber opposite the injector, which first brings the gas to the introduction pressure and compresses it, and then the injector can be opened and the supply of liquid can continue. In a tubular or hose-like pre-chamber, thus a pre-chamber of small cross section, the liquid can compress a gas without itself penetrating into the front region of such a pre-chamber. Thus, gas and liquid remain separated in such a pre-chamber of small cross section, so that when the injector is opened, the gas first enters in a desired way into the plastic melt, but then the liquid follows directly and can also be supplied in a sufficient amount due to the continuance of the liquid feed.

In an especially advantageous embodiment of the method according to the invention, the plastic melt displaced from the internal hollow space formed by the gas in the interior of the plastic component within the injection mold is fed and/or displaced into at least one auxiliary space or at least one auxiliary volume. This is a modified top-blowing method, for which an auxiliary cavity can receive the displaced plastic, which is more favorable relative to top blowing primarily for complicated components.

Here, the amount of gas can be set so that it partially fills the hollow space formed by the gas in the injection mold in compressed form and the cooling liquid is fed into the hollow space, while the gas displaces other plastic melt. Because the cooling liquid generally pushes the gas forward, it can directly follow the gas and thus begin to cool the region closer to the inlet during the formation of the internal hollow space, while the region of the internal hollow space farther away from this inlet is even possibly still being formed.

In one advantageous procedure, the auxiliary space or spaces are filled completely with plastic and the gas and the cooling liquid remain in the internal hollow space of the plastic component formed by them or the auxiliary space or spaces are filled partially with plastic or partially with gas or partially with plastic, gas, and cooling liquid. If the volume of the auxiliary space corresponds exactly to that of the internal hollow space to be formed, it can be sufficient to transport only this displaced plastic from the internal hollow space into the auxiliary space, but to leave the gas and the cooling liquid in the formed internal hollow space until they are discharged again. However, because such a volume setting is difficult under some circumstances, it is more reliable to also force at least a portion of the gas or all of the gas and even a portion of the cooling liquid into the auxiliary space.

Through the presence of one or more auxiliary spaces or auxiliary volumes, an embodiment of the method is possible to the extent that the auxiliary space or spaces are used as additional injection molds and are filled from the first injection mold and by means of a separate filling opening with plastic melt and then an internal hollow space is formed by means of gas and liquid in the auxiliary space or spaces. Above all, if several components are to be produced simultaneously by the injection molding method and provided with internal hollow spaces, such an arrangement can be provided in series, wherein the individual injection molds or auxiliary spaces or cavities can have matching or different contours.

After filling the hollow space or spaces with liquid, the feeding device for the liquid can be shut down and blocked and the liquid can be discharged again especially through the inlet opening. After it has fulfilled the required cooling function, it can be discharged in practice through the same opening, e.g., by means of a two-way or three-way cock, through which it was previously introduced.

The gas can be an inert gas, e.g., a noble gas or preferably nitrogen, optionally also a non-inert gas, air, or another suitable gas mixture can be utilized. As cooling liquid, water can be introduced. Water has a high heat capacity and is well suited for cooling with simultaneously favorable costs.

The melt can be filled through an inlet directly into the injection mold, wherein the connection in the auxiliary space can be closed. After filling the injection mold with plastic, the connection to the auxiliary space can be opened and the gas is injected by means of the cooling liquid in the injection mold into the internal hollow space to be formed and/or at least partially forced into the auxiliary space. Therefore, it is guaranteed that at first the injection mold is filled completely with the plastic melt, thus also complicated external shapes, e.g., thin-walled add-on parts, can be formed before the internal hollow space is produced.

The cooling liquid can be filled into the auxiliary space or the auxiliary volume and then driven out again by means of the gas volume compressed therein. Thus, the fact that the liquid itself pressurizes the gas and also pushes in the reverse direction can be utilized, wherein the gas can then use the compression energy established by the cooling liquid again for discharging the liquid.

In another embodiment of the method, gas for additional flushing and/or driving out of the cooling liquid from the hollow space of the injection mold can be introduced into the auxiliary space.

During the secondary flow of the cooling liquid, at least one part of the gas can be bled off from the auxiliary space or auxiliary volume for maintaining a uniform or reduced counter-pressure and thus, in particular, the pressure can be held constant. Thus, the formation of the internal hollow space is realized with a constant pressure, which is advantageous for the quality of the component to be produced.

In one modification of the method, the plastic melt can be filled via an auxiliary space or the auxiliary volume into the injection mold and then the melt displaced from the internal hollow space of the component with the help of gas and liquid is fed back into the injection-molding machine via the auxiliary volume and the inlet of the melt. Thus, the melt driven out from the internal hollow space is recaptured for another injection-molding process.

Above all, by combining one or more of the previously described features and measures, an internal hollow space can be created with less expense in a component to be produced from plastic with the help of gas, wherein this gas is forced by the cooling liquid, so that the cooling begins directly after or already during the formation of the internal hollow space.

In this way, the method according to the invention can be used for different plastic injection molding methods. For example, the invention can be used with the sandwich method, for which two or more plastics are injected into the mold, so that a component with two or more plastic layers is produced. For the application of the method according to the invention, a multi-layer hollow body with, e.g., a very smooth inner surface and a carrier material can be formed on the outside.

In addition, the method according to the invention can be used for a multi-component method, for which two or more plastics are injected at different locations into the injection mold. The gas and the liquid are then filled such that a structural body is produced with an internal hollow space, which is formed of different plastic sequences, i.e., which has, e.g., alternating hard and soft sections. This could be a tube with alternating hard and soft sections.

The top-blowing method was already mentioned. For this method, the main cavity of the injection mold is filled only partially with a plastic or for a corresponding sandwich method with several different plastics, whereby the gas injected into the melt to a certain extent drives the plastic melt in front of the gas and the mold is completely filled and simultaneously forms the internal space. Here, the cooling liquid also follows the gas directly and provides rapid cooling. In this way, under some circumstances additional functional elements can be integrated into the component by setting these elements into the mold and then plastic is injection molded around these elements and connected tightly to the injected component. The set parts can be formed in the same injection-molding tool, e.g., as a run-off cavity or auxiliary space together with the basic body.

The method according to the invention can also be used for a material recompression method with several injection points. The material recompression method can be embodied, so that the plastic is injected by means of an injection point at one end of the injection mold until this is completely filled. Then, with the help of the gas, plastic material can be forced back through another injection point at the end of the injection mold or the component. Both injection points must be connected to a hot channel and must be able to be controlled separately, so that the melt can be led back into the plastifying aggregate via this hot channel.

The described method, for which a gas is forced with the help of a cooling liquid into an injection mold and the plastic melt, can also be used in a multiple-compartment tool, wherein a tool is embodied such that several cavities are provided with corresponding injectors. Here, all cavities should be able to be controlled both simultaneously and also independently from each other with the gas supply.

It is also conceivable that the method according to the invention is used for components, for which inserted parts or films and sheets as well as textiles (woven fabric, braids, knitted fabric, etc.) are inserted into the mold, wherein plastic is then injection molded behind or around these inserts. These inserted parts can be used for reinforcement, as decoration, or for fulfilling additional functions.

The method according to the invention also enables hollow bodies or hollow channels to be realized within a complex component, such that one or more channels branch away from each other. Components are conceivable, in which one or more hollow channels contribute to the mechanical stability of the entire component.

For the method according to the invention, which can also be designated as a gas-water injection method, the processing parameters to be set are of great importance. Here, volume flow regulation of the injection of the liquid, which then drives the gas, is preferred to be pressure-regulated in order to be able to equalize material inhomogeneities during the method. Therefore, it is preferable when the front of the bubble penetrating into the plastic moves with essentially constant speed through the component during the injection. This means that for varying component cross sections, the volume flow of the liquid to be introduced should be adapted accordingly. This can be realized for corresponding regulation by means of volume flow profiles.

The volume flows to be set are dependent on the component geometry and the plastic that is used. For materials with high crystallinity (e.g., glass-fiber reinforced polymide 6 and 6.6), low volume flows (approximately 5-10 liters per minute) are advantageous, while for materials with low crystallinity (e.g., polypropylene) and amorphous materials (e.g., polycarbonate), high volume flows (approximately 10-30 liters per minute) lead to good results.

Another important parameter is the viscosity of the plastic melt, which can be varied during the injection-molding process with parameters such as the mass temperature and the injection molding rate of the plastic. Here, lower temperatures than those recommended by the material manufacturer lead to higher viscosity values and thus good results. Special materials with higher viscosity values and special filling agents increase the quality of the components in terms of constant residual wall thickness and smooth inner surface of the generated internal hollow space as well as the reproducibility of the process or the method.

The device according to the invention used for carrying put the method of the type mentioned in the introduction provides that the inlet for the gas is also simultaneously the inlet for the cooling liquid and in front of the inlet there is a receiving space with a small cross section for the gas. On the side of this space facing away from the inlet, the receiving space has a connection to a feeding device for cooling liquid, so that the gas can be compressed before being injected into the injection mold by means of the cooling liquid.

Therefore, before the inlet into the injection mold, in which the gas is to be injected under pressure, there is a space with a smaller cross section for this gas, which is set under pressure in this space by the cooling liquid and thus can be compressed such that it obtains the desired pressure for being injected into the plastic melt.

In one advantageous embodiment of the device according to the invention, an injector arranged in the injection mold for the gas and the cooling liquid is connected in its cavity to a hose or tube for receiving the gas and the end of the hose or tube facing away from the injector is connected to a space that can be changed in terms of its internal volume, especially with an inner piston or a cylinder with an adjustable membrane. In this space or cylinder there is gas in an amount preselected and predetermined by different piston settings, especially at a preselected pressure, between the piston or membrane and the inlet into the hose or the tube, and the changeable space has an additional inlet for the cooling liquid.

Through this embodiment of the device, it is possible to first collect the gas before introducing it into the injection mold spatially in front of the injector and thus to bring it to the desired pressure with the help of the cooling liquid and thus with the help of the space, which can be changed in its volume for setting the amount of gas, before it is introduced through the injector into the injection mold and thus into the plastic melt previously inserted there in order to displace this within the injection mold in a top-blowing method and in this way to form the internal hollow space or in order to force a part of the plastic from the injection mold into an auxiliary space or back into the injection-molding machine. Here, the subsequent liquid flow maintains the gas pressure completely or partially and is introduced itself into the internal hollow space created by the gas and cools the plastic.

The changeable space or cylinder can be arranged vertically and the piston or the membrane for changing the internal space can be moved from bottom to top and/or vice versa and the cooling liquid can be located on the piston due to gravity and the gas above this liquid. Thus, the desired arrangement of gas above the liquid level is created and supported by gravity in the changeable space. Thus, liquid can be prevented from penetrating into a region, in which the gas is to be located in order to be able to first press it into the injection mold.

An especially simple construction is produced when the inlet into the changeable space for the cooling liquid is provided above the longitudinal inner hollow of the piston rod and the piston. Therefore, in each case, to inject the liquid into the changeable space, it is guided from the bottom to the top side of the piston or in an analogous way a membrane and displaces gas located above this, e.g., air, within the cylinder upwards.

In this way, a pump and optionally a pressure storage device for cooling liquid can be arranged in the supply of the cooling liquid to the changeable space. However, any other form of pressure generation for the cooling liquid, e.g., mechanically or electrically activated pistons or a pressure converter, are also possible.

The line leading to the inlet into the changeable space can have a branch, by means of which after closing the liquid supply gas and after closing the gas supply the liquid can be introduced into the changeable space, especially into the cylinder. Thus, first the part of the branch supplying the cooling liquid can be closed and gas can be introduced into the changeable space in a predetermined amount. Then, the gas supply can be closed and the cooling liquid supply line is opened to then allow the cooling liquid to enter behind the gas into the changeable space or cylinder and thus to compress the gas.

The injection mold can have at least one additional cavity or other injection molds for another injection-molded part or component and/or a different or additional cavity as an auxiliary space or auxiliary volume. Thus, several components can also be produced simultaneously in a way according to the invention.

The additional cavity can be separated from the first cavity of the injection mold by means of a stopper or slider. Thus, initially the first cavity can be filled with plastic melt and then the gas can be introduced into this cavity, wherein simultaneously or before the stopper or slider is to be opened so that the melt displaced from the internal hollow space to be formed is led into the additional cavity, where it can either form another component itself or can be received as excess plastic.

The auxiliary space or the auxiliary volume can have an additional gas injector for driving out the cooling liquid after the manufacturing process and for flushing the internal hollow space of the plastic structural body. This can contribute to accelerating the manufacturing time for the component. The faster the cooling liquid is driven out, the sooner the component can be removed.

In a modified device, the inlet opening into the injection mold is provided in the auxiliary space or auxiliary volume, so that at first the auxiliary space and then the actual shape or cavity can be filled with injection molding material and the plastic displaced from the internal hollow space of the structural body can be moved through the feeder opening of the auxiliary space or auxiliary volume again, in particular it can be fed back into the injection-molding machine. Thus, at first the actual cavity for the component in the injection mold can be filled via the auxiliary space, whereby the auxiliary space is also filled. Then, from the opposite side, the gas can be injected into the mold with the help of the cooling liquid and can form the internal hollow space of the component, wherein the melt displaced in this way is pressed back via the auxiliary space together with melt still located there into the injection-molding machine for reuse.

On the auxiliary space, an outlet opening for gas and/or cooling liquid can be provided, which is connected via a throttling valve to the atmosphere or to a receiver space or the like. Thus, gas for creating the internal hollow space of the component can be bled off in a controlled or targeted way and thus, in particular, the pressure of the gas can be held constant in the internal hollow space formed by the gas.

For the cooling liquid that can be supplied by means of a pump, a volume flow regulation can be provided, which has an advantageous effect on the quality of the component.

The auxiliary space or spaces can also be open to the environment, especially via a throttle, with a spacing to their connection to the first cavity or injection mold. Therefore, the gas can also be bled off in a targeted way for maintaining or setting a desired pressure, especially if the gas is nitrogen or air or a noble gas.

The connection between the injection mold and the auxiliary space can be dimensioned and narrowed without a seal and continuously and especially such that it forms a throttle between the injection mold and the auxiliary space. Therefore, a slider or seal is not necessary at this point. In another embodiment of the device according to the invention, several auxiliary spaces are arranged in the injection mold in line one behind the other and/or parallel one next to the other and are shaped in particular as cavities used for injection molding of other components. Then they can exert a double function, in that first they can be used as auxiliary spaces and then also simultaneously as cavities for shaping other components.

Here, in another embodiment, a cavity that can be used and embodied on its side as an injection mold and that forms an auxiliary space to a first injection mold has on its side a connection to an auxiliary space, so that a structural body can also be produced in this other cavity with or without an internal hollow space and the gas pushed by the cooling liquid is led through several cavities.

Finally, it is also possible that the injection mold is arranged with or without auxiliary space or spaces several times within an injection-molding tool and therefore this is embodied as a multiple compartment tool, so that a corresponding economical production of several components is possible simultaneously according to the different, known injection molding methods also with internal hollow spaces.

Above all, combining one or more of the previously described features produces devices, which can produce hollow bodies from plastic in an advantageous way, wherein the internal hollow or the internal hollow space is produced by a gas, which is introduced and injected under pressure. This gas is set under pressure with the help of the cooling liquid, so that this cooling liquid directly follows the gas and provides a nearly immediate cooling of the created internal hollow space even during its production. For example, it can be sufficient when 10% of the produced hollow space is filled by the gas volume, so that after producing this hollow space, when this gas amount assuming approximately 10% in volume has reached the end of the internal hollow space to be created, already approximately 9/10 of this internal hollow space has been filled with cooling water. Due to this fast cooling, a correspondingly precise and smooth inner surface of the internal hollow space is produced with good dimensional accuracy of the wall thickness.

BRIEF DESCRIPTION OF THE DRAWINGS

In the following, embodiments of the invention are described in more detail with reference to the drawing.

FIG. 1 is a view of an injection mold after the filling of the cavity forming the component, while an auxiliary space is still closed and the gas for forming the internal hollow space and also the cooling liquid have not been supplied, FIG. 2 is a view corresponding to FIG. 1 for injecting the gas into the plastic melt within the cavity of the injection mold, wherein a part of the plastic melt is displaced by the gas into the auxiliary space that has been opened in the meantime and the gas on its side is compressed and injected by the cooling liquid, FIG. 3 is a view corresponding to FIGS. 1 and 2, wherein the gas is displaced farther into the interior of the component and the internal hollow space is nearly completely emptied of plastic melt, wherein the cooling liquid is likewise partially displaced into the internal hollow space, FIG. 4 is a view corresponding to FIG. 3, wherein the gas is led already up to the auxiliary space and the cooling liquid fills and cools the internal hollow space of the component within the injection mold to the greatest degree, FIG. 5 is a view corresponding to FIG. 4, wherein the gas is displaced completely into the auxiliary space and compressed there and the cooling liquid fills the entire interior, FIG. 6 is a view corresponding to FIG. 5, wherein the cooling liquid is likewise injected into the auxiliary space, FIG. 7 is a view corresponding to FIGS. 1-6, wherein an injector provided in the auxiliary space is pushed into the position of use and air or gas for additional flushing and driving of the cooling liquid is introduced via this other injector, FIG. 8 is a modified view analogous to FIG. 4, wherein an injector is in the auxiliary space in the position of use and an outlet of the displaced gas is enabled by a throttling valve, FIG. 9 is a view of a device generally according to FIG. 1, wherein between an auxiliary space and the actual cavity for forming the component, there is no seal and the feeder opening for supplying plastic melt to the auxiliary space is provided, wherein the auxiliary space and the cavity for the component are filled with plastic melt, FIG. 10 is a view of the embodiment according to FIG. 9, wherein analogous to FIG. 2, the gas compressed by the cooling liquid is injected into the component, FIG. 11 is a view of the embodiment according to FIGS. 9 and 10, wherein the cooling liquid has driven the gas farther relative to FIG. 10 and is itself injected into the resulting internal hollow space of the component, generally corresponding to FIG. 3, wherein melt is fed via the auxiliary space and the feeder opening back into the injection-molding machine, FIG. 12 is a view analogous to FIG. 11, wherein the cooling liquid fills the entire internal hollow space of the component, generally corresponding to FIG. 5 or 7, FIG. 13 is a view similar to FIG. 8, wherein the auxiliary space is not closed, but open to the environment via a throttle, FIG. 14 is a view of a modified embodiment, for which no auxiliary space is connected to the cavity or mold for the component to be injection-molded and this cavity is initially filled partially with plastic melt, FIG. 15 is a view according to FIG. 14, wherein in the partial filling of the cavity with plastic melt, the gas compressed by the cooling liquid is injected and therefore the plastic melt is distributed back into the cavity and simultaneously the internal hollow space of the component is formed, as well as FIG. 16 is a view corresponding to FIGS. 14 and 15, wherein the internal hollow space is shaped within the plastic with the help of the injected gas and the cooling liquid is injected at least partially therein and the plastic melt or the component fills the cavity of the injection mold completely.

DETAILED DESCRIPTION OF THE PREFERRED EMBODIMENTS

Figure 1:
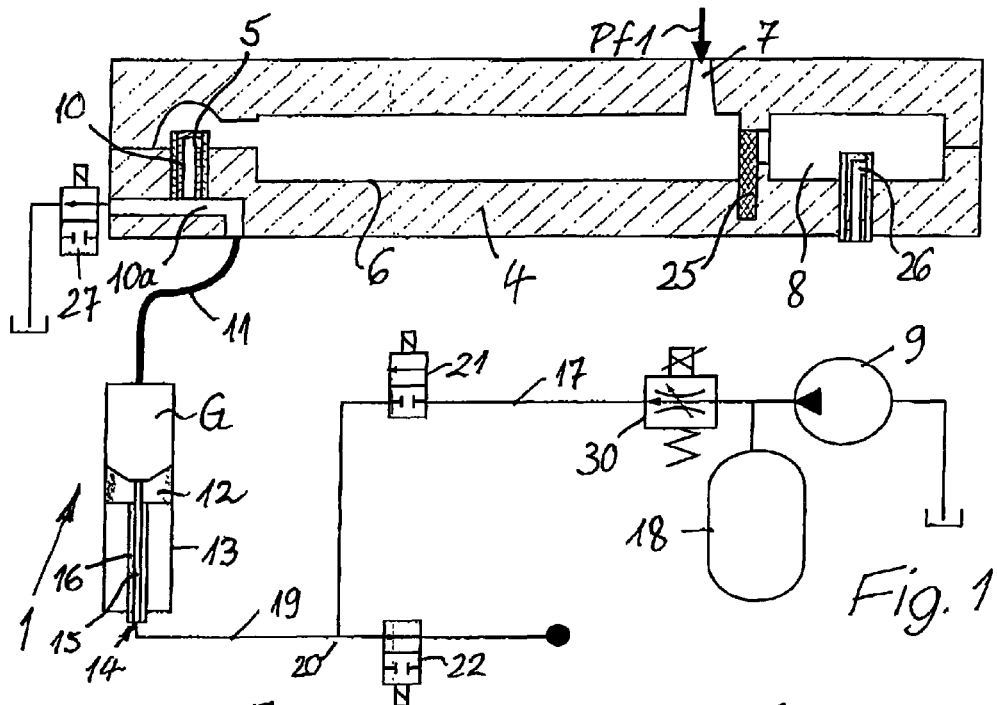
FIGS. 1-16 show in a schematic view a longitudinal section of an injection mold in the region of the cavity, in which a component is to be formed, with connection for the plastic melt on one side and for the gas forming the internal hollow space, as well as for the cooling liquid on the other side in various variations. Shown in detail are.

In the following description of several embodiments of the invention, parts or objects that have matching functions are given matching reference numbers even for modified structures.

A device designated as a whole with 1 is used for producing a plastic component 2 with an internal hollow space 3 (cf., e.g., FIGS. 3-8, FIGS. 11-13, or FIG. 16). The essential part of this device 1 is an injection mold 4, which can be connected to an injection-molding machine and which has a connection 5 for introducing gas G, for displacing melt from the later internal hollow space 3 of the component, and for introducing a cooling liquid F, especially water. The injection mold 4 further has at least one cavity, thus a negative mold 6, which gives the component 2 its outer shape, such that plastic melt is injection molded in this cavity and this is filled, as viewed from an internal hollow space 3. The injection mold 4 further has an inlet opening 7 for the melt, which can lead directly into the cavity 6 according to FIGS. 1-8 and 13 or into a still-to-be-described auxiliary space 8 for the cavity 6 according to the FIGS. 9-12.

In all embodiments, the connection 5 embodied as an injector for the gas is simultaneously also the inlet for the cooling liquid F, so that the liquid directly follows the gas G for forming the internal hollow space 3 and provides cooling of the component 2 within its internal hollow space 3 without time delay.

In front of the connection or inlet 5, one can see a receiving space with a small cross section for the gas, which has on its side facing away from the inlet 5 a connection to a feeding device for the cooling liquid, in the illustrated embodiment a pump 9, so that the gas G can be compressed by means of the cooling liquid F before the inlet 5 into the injection mold 4.

An injector 10 arranged in the injection mold 4 and used as the connection 5 or inlet for the gas and for the cooling liquid is connected in the embodiments via a channel 10a to a hose 11 or tube as a receiving space with small cross section for the gas. The end of this hose 11 facing away from the injector 10 is connected to a space, which can change in terms of its internal volume, in the embodiments with a cylinder 13 with an inner piston 12. In which space or cylinder 13, there is gas G between piston 12 and inlet into the hose 11 or a tube in an amount that is preselected and predetermined by different positions of the piston 12. Here, this changeable space or cylinder 13 also has an inlet 14 for the cooling liquid F, so that this can be compressed after the filling of the gas and also after the entrance of the gas, above all, within the hose 11, without the piston 12 having to be moved.

In this way, the changeable space or cylinder 13 is arranged vertically in the illustrated embodiments, and the piston 12 for changing the interior and determining the amount of gas can be moved from bottom to top and vice versa. The cooling liquid F is arranged on the piston 12 due to gravity and above this the gas G. If the cylinder 13 is filled further with cooling liquid, this liquid displaces the gas, so that it is compressed and is pressed into the cavity 6 of the injection mold 4 after opening the injector 10.

The inlet 14 into the changeable space, in this embodiment in the cylinder 13, for the gas and for the cooling liquid is here embodied as a longitudinal internal hollow 15 of the piston rod 16 and the piston 12. Thus, one after the other the gas and the cooling liquid can be led through the piston rod 16 and the piston 12 into the interior of the cylinder 13 above the piston 12.

In the supply 17 of the cooling liquid to the changeable space or cylinder 13, the pump 9 and in this embodiment also a pressure-storage device 18 for cooling liquid are arranged, so that the required pressure can be exerted on the previously introduced gas.

In this way, the line 19 to the inlet 14 has a branch 20, via which after closing the liquid supply 17 with the help of a valve 21, gas G and after closing the gas supply with the help of a valve 22, the cooling liquid F can be introduced into the changeable space or cylinder 13. The gas source 23 is portrayed just as a schematic in the figures. The gas source can be, e.g., a compressor, a gas bottle, or an industrial compressed-air network, which enables pre-compression of the gas G in the cylinder 13.

Figure 2:
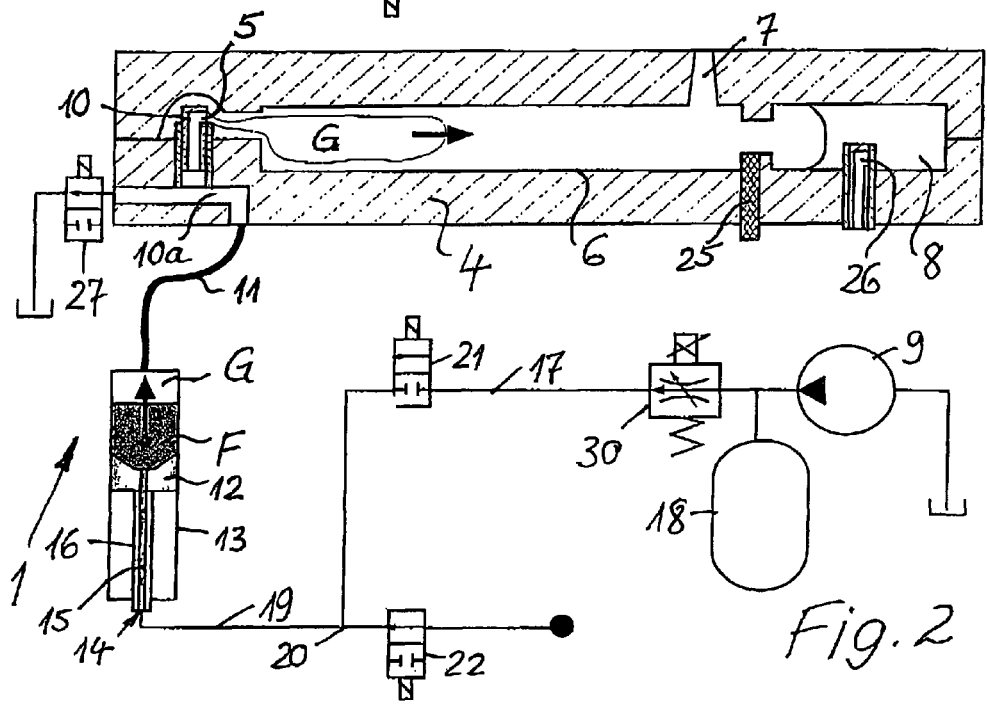
Figure 3:
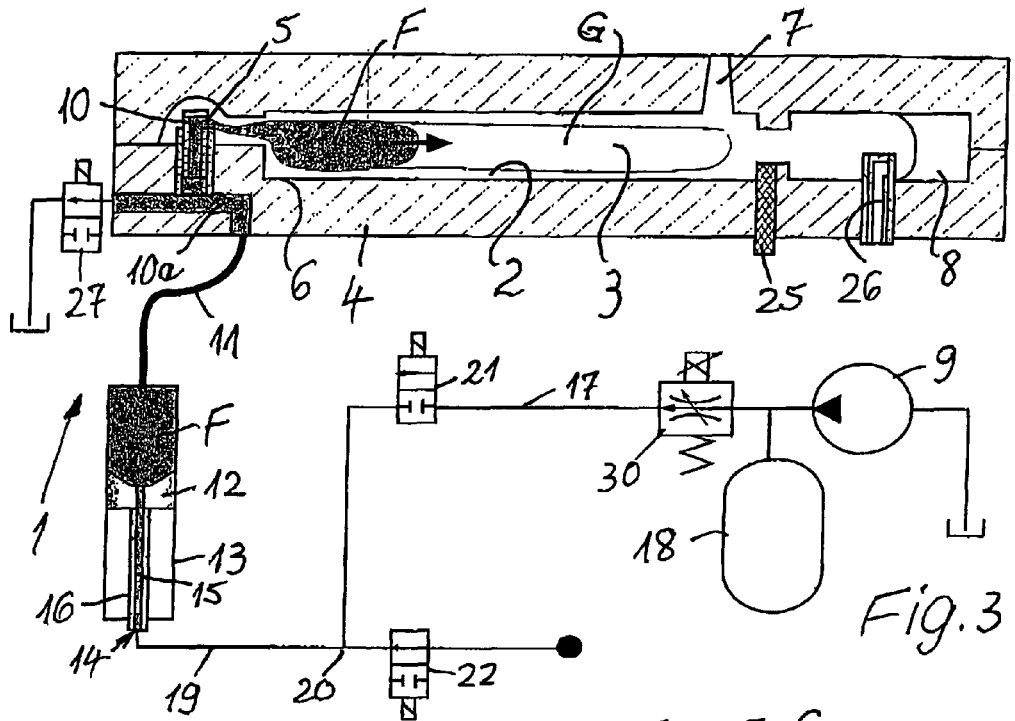

In the embodiments according to FIGS. 1-13, the injection mold 4 has, in addition to the cavity 6, another cavity, which is used as auxiliary space 8 or auxiliary volume and which can receive the plastic displaced during injection of the gas into the plastic melt according to FIG. 2, so that the hollow out of the plastic component 2 can be realized without a problem, in that the plastic melt previously filling the internal hollow space 3 to be created is displaced into this additional cavity 6. In this way, according to FIGS. 1-8, the additional cavity 8 can be separated from the first cavity 6 of the injection mold 4 by means of a stopper or slider 25, which is closed according to FIG. 1 and thus separates the additional cavity 24 from the first cavity 6, when the plastic melt is injection molded according to the arrow PF1 through the inlet opening 7 into the injection mold 4 and its first cavity 6.

Then, according to FIG. 2, if the gas G is injected with the help of the cooling liquid F via the connection or inlet 5, the slider 25 is moved into the open position.

According to FIG. 2, the gas injected first then displaces a portion of the plastic melt into the second cavity or the auxiliary space 8. According to FIG. 3, then the cooling liquid, which keeps the gas further under pressure within the already produced internal hollow space 3 and which also provides for further displacement of the gas, follows the gas, so that this is also led into the auxiliary space 8 according to FIG. 4 and can even be completely displaced into this auxiliary space 8 according to FIG. 5, wherein according to FIG. 6, the cooling liquid can even be partially fed into the auxiliary space 8.

Here, the embodiment according to FIGS. 1-8 and also the embodiment according to FIGS. 9-12 show that the auxiliary space or the additional cavity 8 can have an additional gas injector 26 for driving out the cooling liquid after the manufacturing process and for flushing the internal hollow space 3 of the plastic structural body 2. Thus, the hollow space 3 can be emptied and blown after the cooling of the plastic according to FIG. 7, in that, e.g., air or the gas or mixture used for forming the internal hollow space 3 can be introduced in the opposite direction through this additional gas injector 26 and the liquid as well as this gas is driven out via an outlet valve 27, which is then opened.

Figure 8:
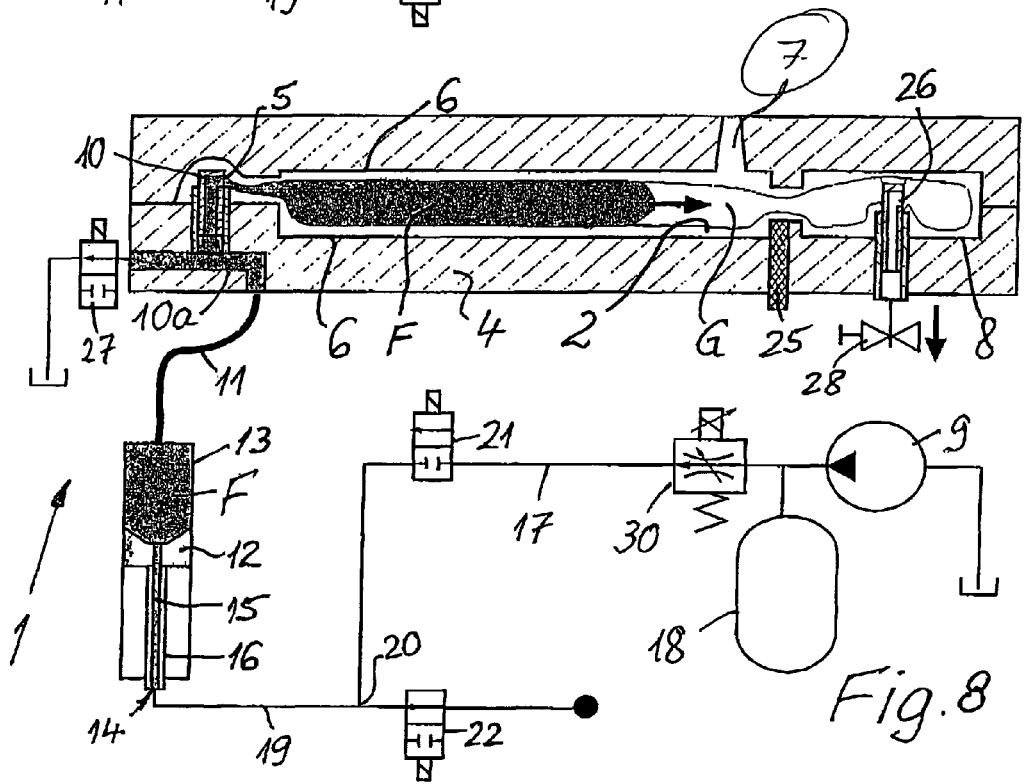
Figure 9:
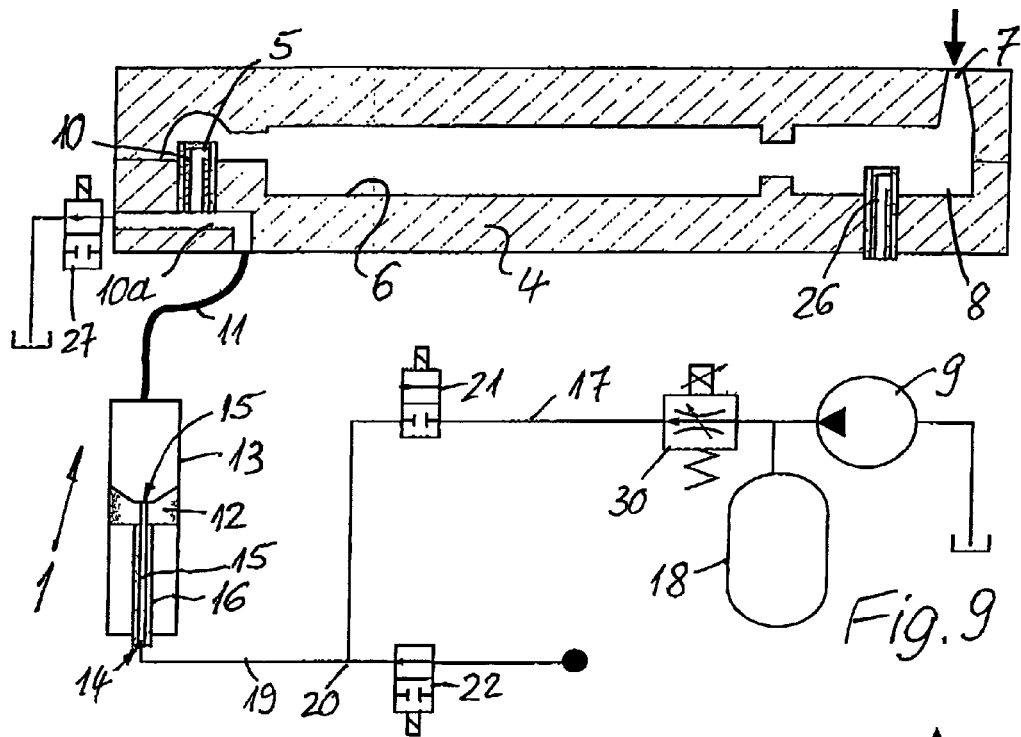
Figure 10:
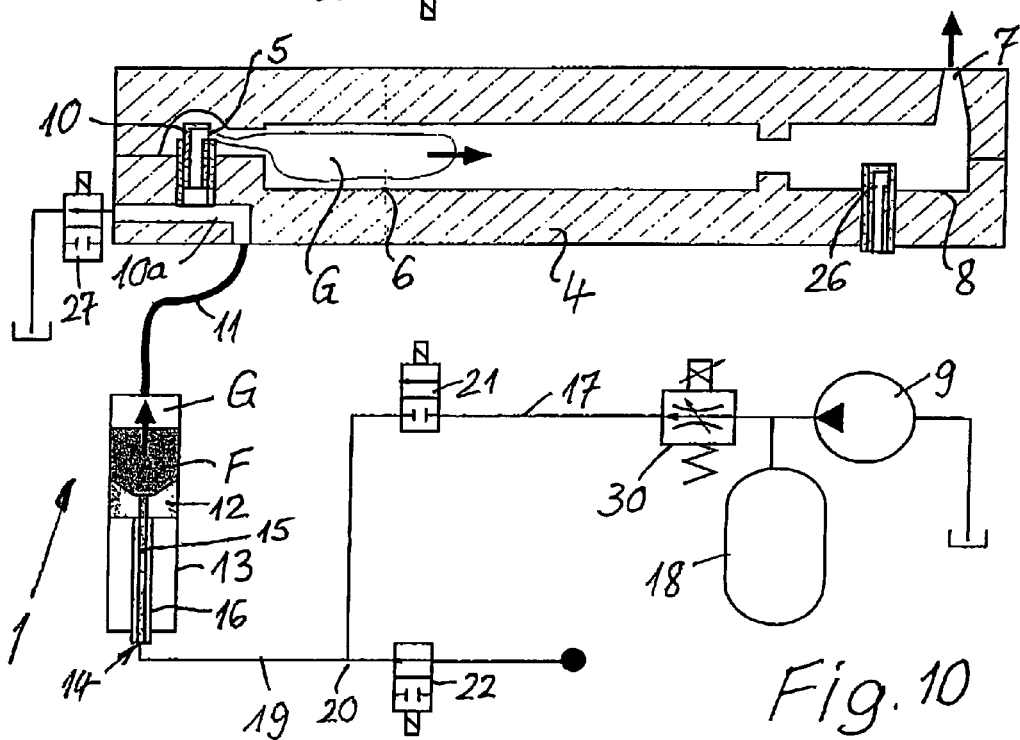
Figure 11:
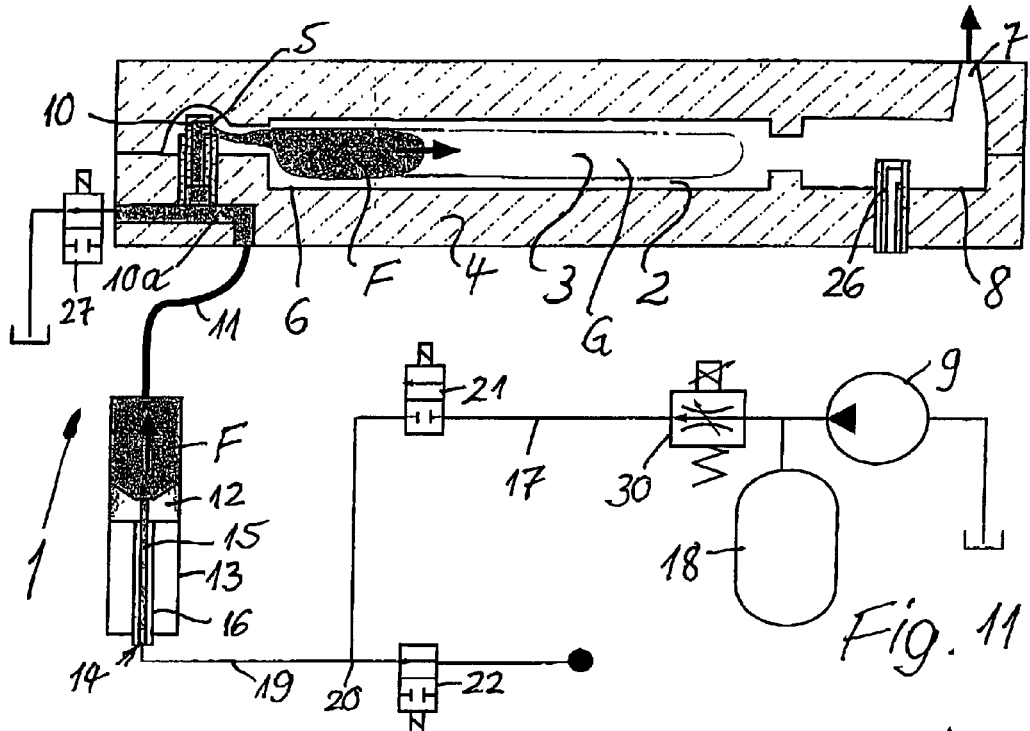
Figure 12:
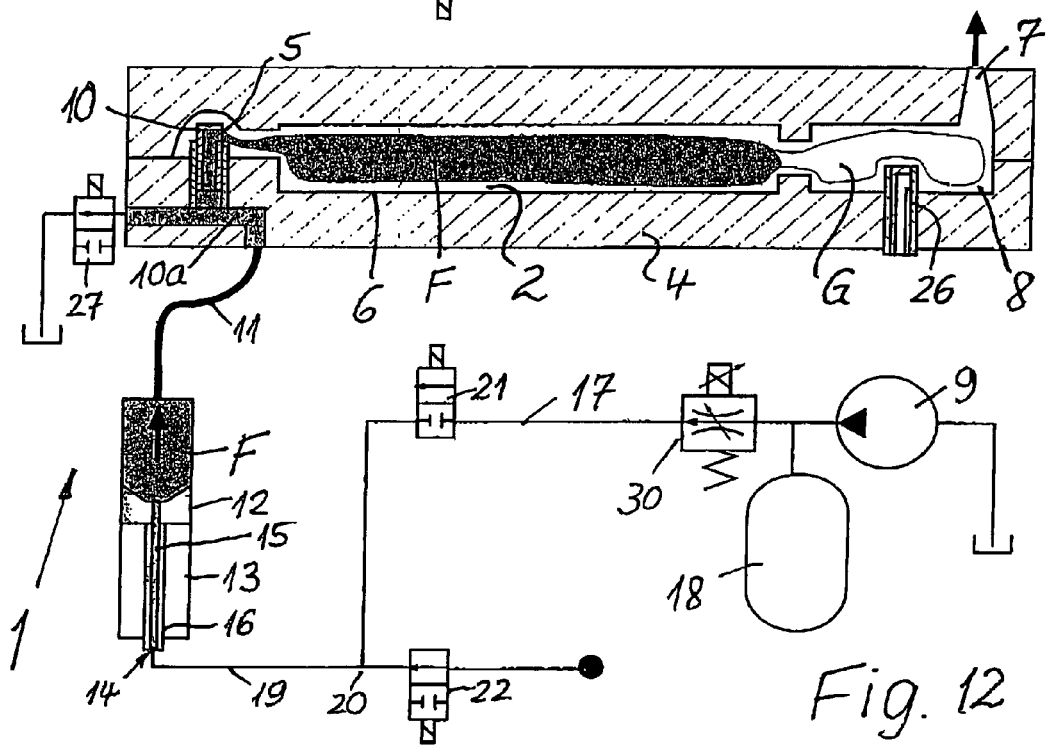

According to FIG. 8, however, a throttling valve 28 can be attached outwards on the injector 26, i.e., the gas compressed by the liquid can be discharged via this additional injector via the throttle 28, whereby the pressure of the gas during its displacement can be held constant.

Figure 13:
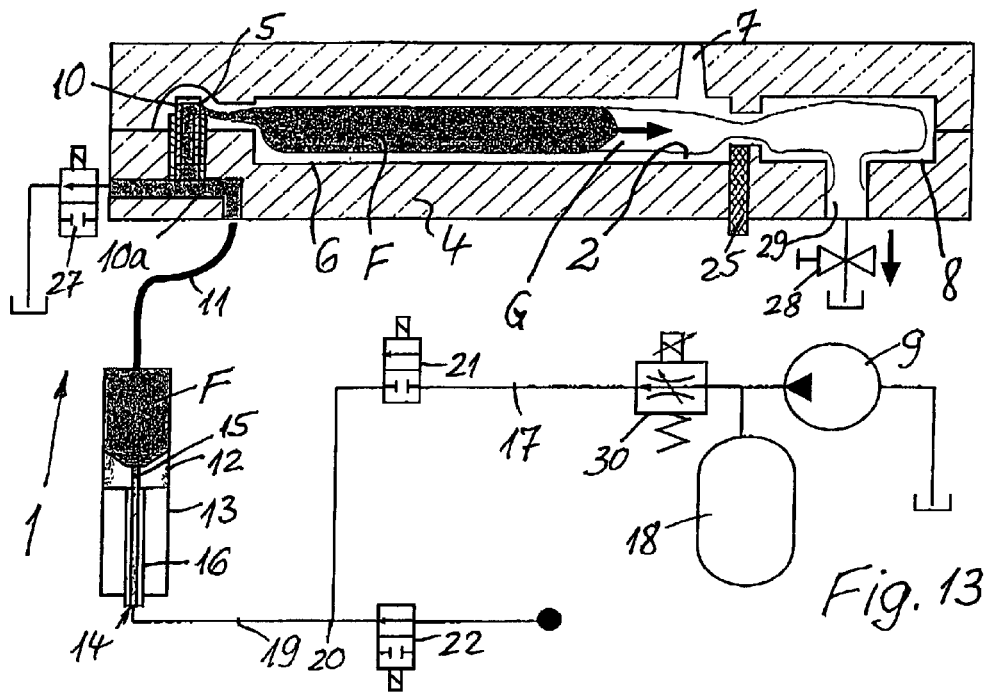

Instead of this, however, according to FIG. 13 there can also be an outlet opening 29 for the gas on the auxiliary space 8, which can be connected to the atmosphere or a collection space via a throttling valve 28, so that at this point gas can be bled off throttled in turn in order to keep its pressure constant. Finally, cooling liquid can also be bled off via this opening 29 and the throttling valve 28.

In the embodiment according to FIGS. 9-12, the inlet opening 7 for the plastic melt is provided in the injection mold 4 on the auxiliary space or the other cavity 8, so that at first this auxiliary space 8 and then the first cavity 6 of the mold 4 are filled with injection-molding material 4. The plastic displaced from the internal hollow space 3 of the structural body 2 is thus led out again according to FIGS. 2-12 via the injector 10 also provided in this case through the inlet or feeder opening 7 of the auxiliary space 8 and fed back, e.g., into the injection-molding machine, so that this plastic is available for other components 2.

In the embodiment according to FIGS. 9-12, the connection between the injection mold and its first cavity 6 and the auxiliary space 8 or the other cavity is open and continuous without a seal and in this way dimensioned and narrowed such that it forms a throttle between the injection mold and its cavity 6 and the auxiliary space 8. Thus, the displacement of the plastic from the internal hollow space 3 to be formed counteracts a certain resistance, which leads to the desired precise formation of the internal hollow space 3.

It should be mentioned that the cooling liquid that can be supplied by means of the pump 9 has a volume flow regulation in the form of a volume flow valve 30.

Figure 14:
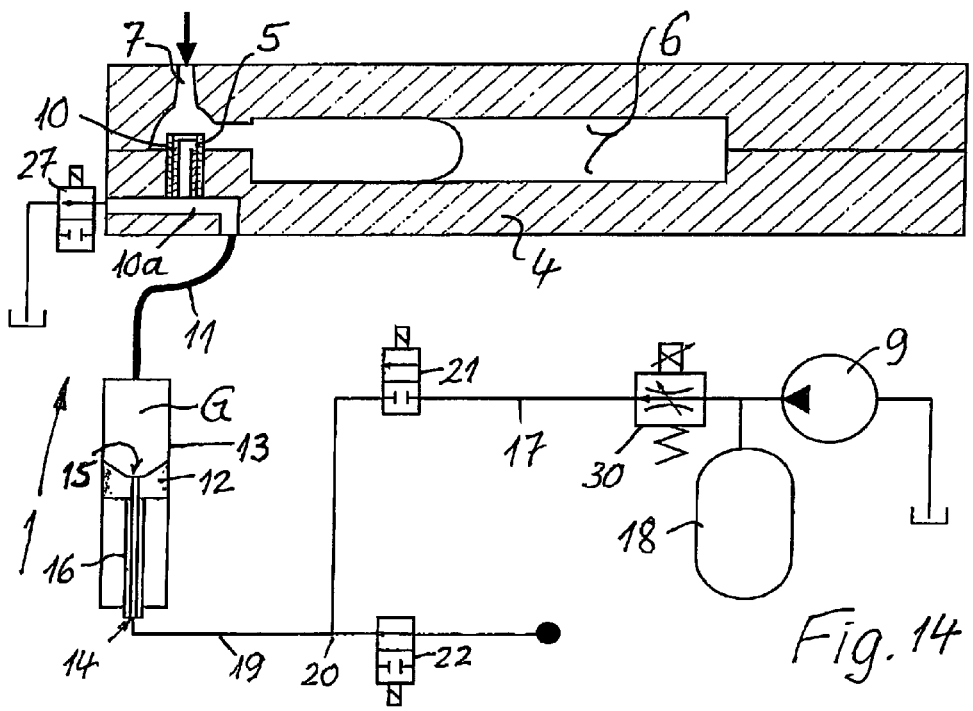
Figure 15:
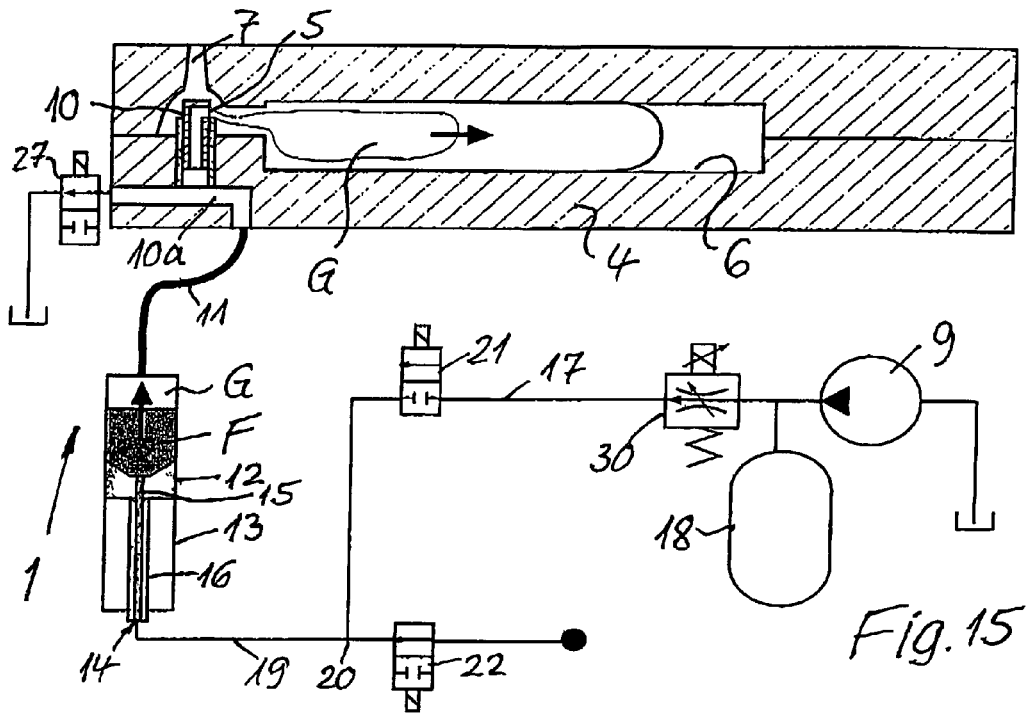
Figure 16:
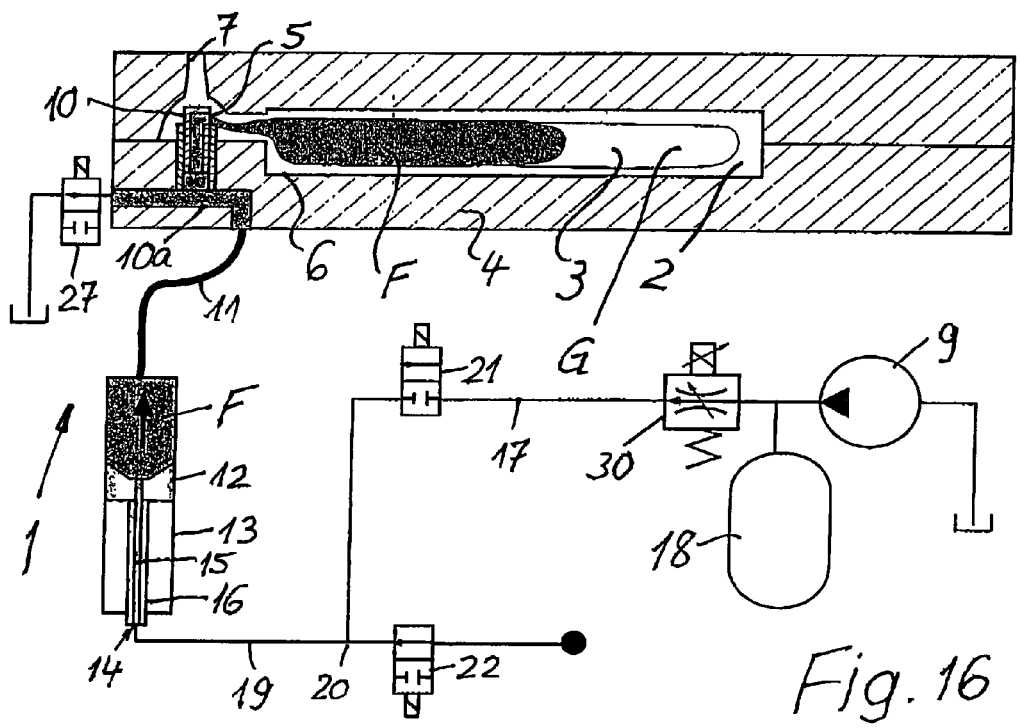

In the embodiment according to FIGS. 14-16, no other cavity 8, thus no auxiliary space, is provided, because in this case, the cavity 6 of the injection mold 4 is filled only partially with plastic, as FIG. 14 shows, whereby then top-blowing with the help of the gas and the cooling liquid is realized according to FIGS. 15 and 16, so that a component 2 is also produced with an internal hollow space 3. Here, the gas can also be compressed with the help of the cooling liquid and injected into the plastic, whereby this plastic is blown within the cavity 6 and forms the hollow structural body corresponding to the cavity 6.

With the help of the previously described devices, in each case at least one plastic component 2, in the case of multiple compartment injection-molding tools 4 with several cavities 6 also several such components 2, can be produced and with an internal hollow space 3 through the injection of gas, wherein in the corresponding injection mold 4, at first plastic is injection molded, then gas is introduced under pressure into the liquid plastic melt for displacing the melt from the internal hollow space 3 to be formed and injected, and then for cooling the plastic a cooling liquid is introduced into the internal hollow space 3 and thus a time delay of the cooling process is prevented, such that the gas is injected and pressed in with the help of the cooling liquid into the plastic melt. In the pre-chamber of small cross section located in the direction of flow in front of the injection mold 4 and its cavity or cavities 6, in the embodiment in the hose 11, the gas is brought to the introduction pressure by means of the cooling liquid and then introduced into the injection mold 4 and the melt located there, as shown step by step in FIG. 1-3 or 4.

Figure 4:
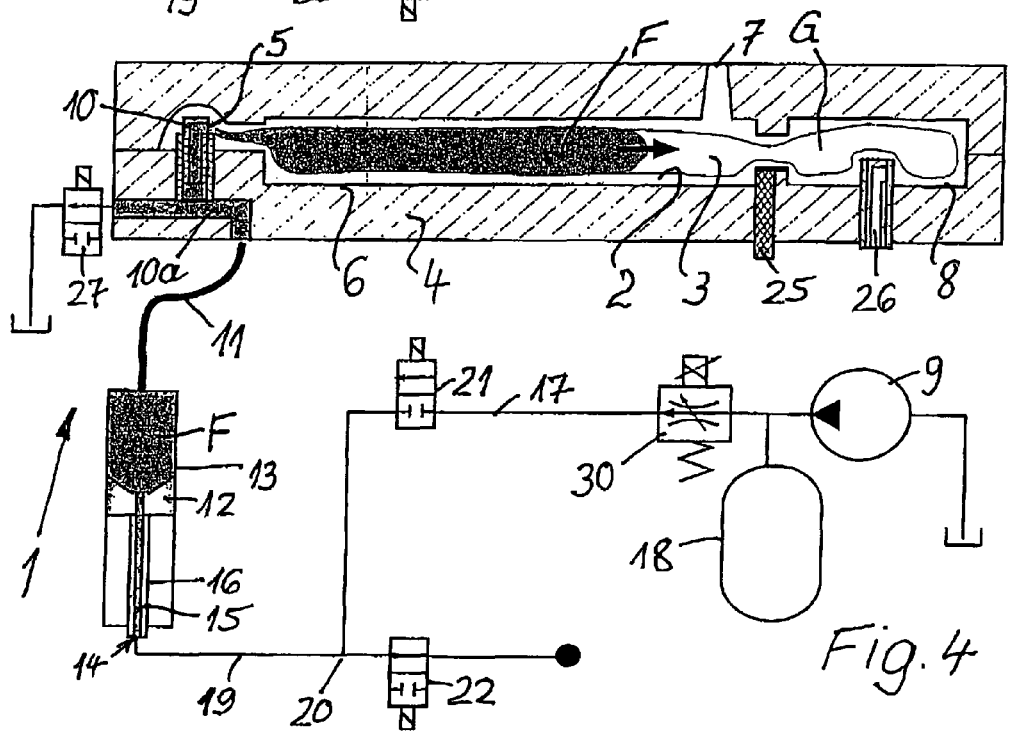
Figure 5:
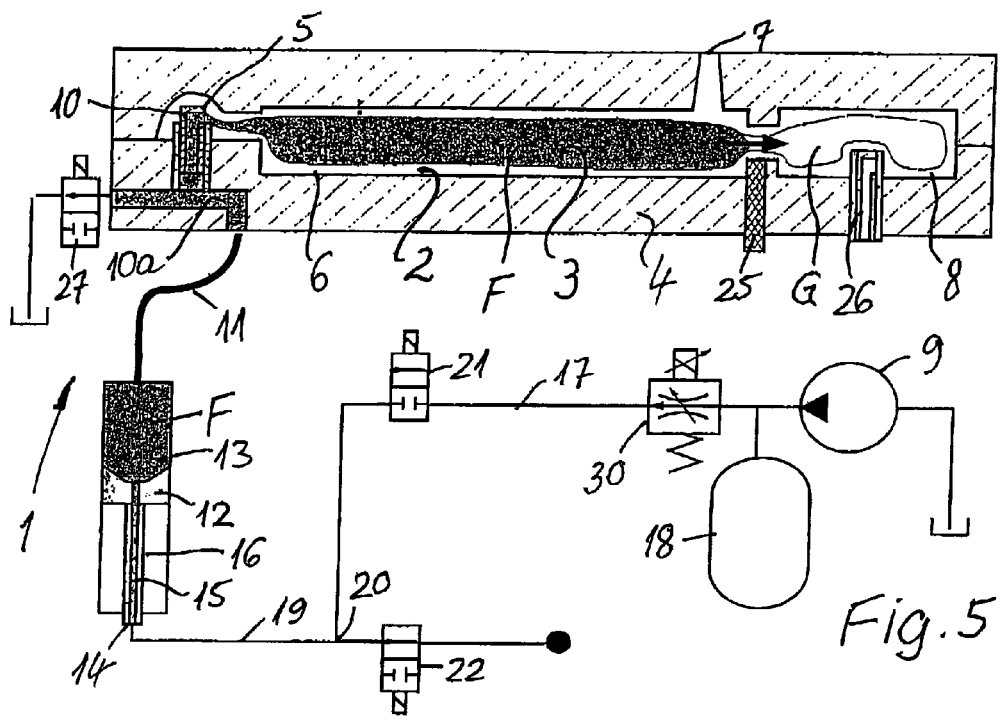
Figure 6:
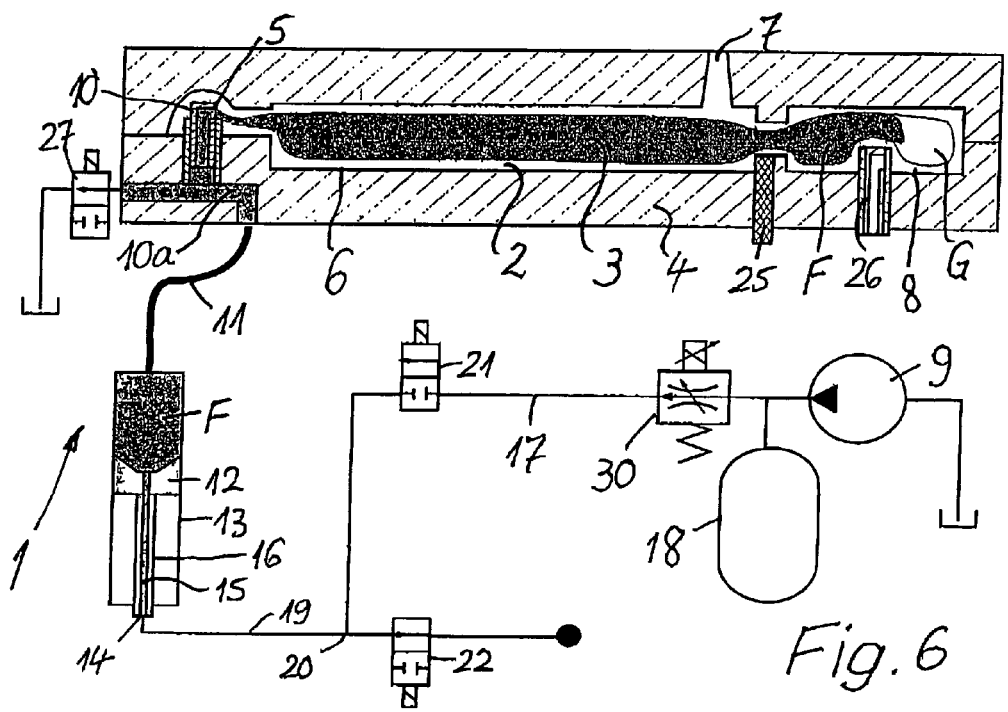
Figure 7:
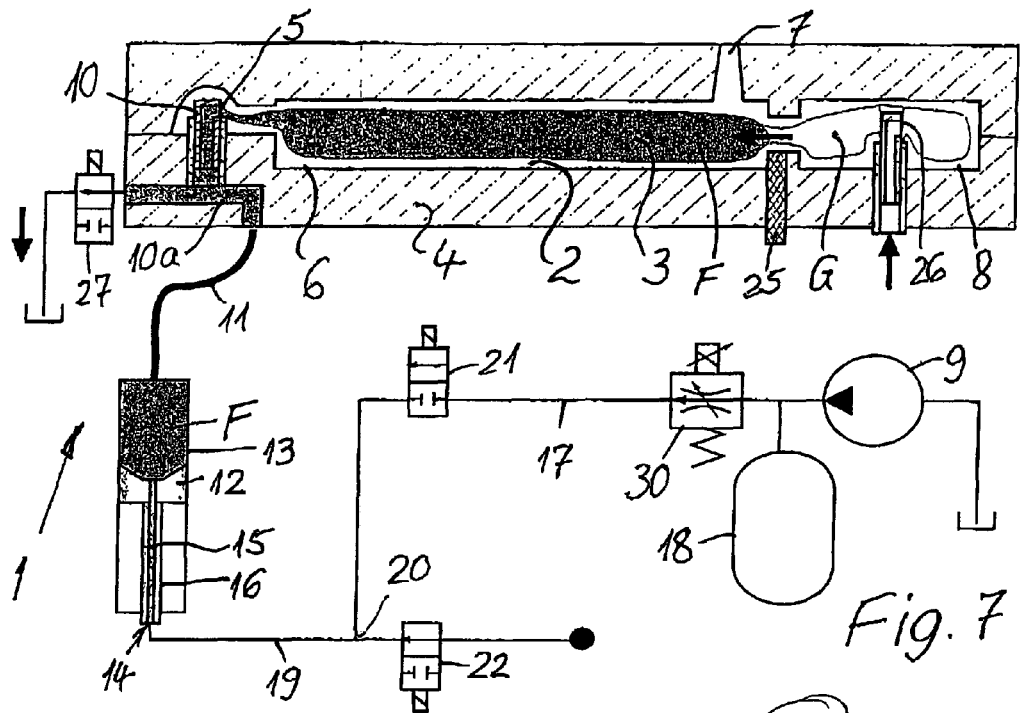

After reaching the state according to FIG. 4, the procedure could be stopped already. However, according to FIGS. 5 and 6, even more cooling liquid can be forced into the gas to improve the cooling effect.

Then, cooling liquid and gas can be bled off, e.g., via the valve 27, wherein this procedure can be supported through additional injection of gas or air into the auxiliary space or the other cavity 24.

Here, for the formation of the internal hollow space 3, the gas is first filled into a hose-like pre-chamber 11 connected to the injector 10 in a measured amount and at the end of the hose 11 opposite the injector 10 liquid is supplied, which brings the gas first to the introduction pressure and compresses it, after which the injector, which is shown still closed in FIG. 1, is opened according to FIG. 2 and then the supply of the liquid is continued through the piston 12 into the cylinder 13.

The amount of gas is predetermined here with the help of the changeable space, in the embodiments by setting the piston 12 in the cylinder 13.

Here, the gas fills the hollow space 3 formed by it only partially according to FIGS. 2 and 3 or 10 and 11 or 16, i.e., the cooling liquid can be injected already into the hollow space 3, while the gas still displaces plastic melt. The desired cooling is realized correspondingly effectively and quickly.

An inert gas, e.g., noble gas or nitrogen, but also optionally a non-inert gas, a gas mixture, or air is used as the gas, which is available especially economically. As cooling liquid, water is especially suited, because it is also economical and has a high heat capacity.

With the embodiment according to FIGS. 1-9, the melt is filled through an inlet 7 directly into the cavity 6 of the injection mold 4, wherein the connection to the auxiliary space or the other cavity 8 is closed with the help of the slider 25. After filling the injection mold 4 with plastic, the connection to the auxiliary space 8 is opened and the gas is injected or at least partially pressed also into the auxiliary space 8 by means of the cooling liquid into the injection mold, so that an effective formation of the hollow space 3 and in the direct connection or even during the connection of the hollow space 3 the cooling is already realized. In this way, the cooling liquid can be filled up to the auxiliary space 8 and then can be driven out by means of the gas volume compressed therein. The possibility of introducing gas in the auxiliary space 8 for additional flushing and/or driving out of the cooling liquid from the hollow space 3 was already mentioned.

To bleed off at least a portion of the gas from the auxiliary space 8 for maintaining a uniform or a reduced counter pressure during the secondary flow of the cooling liquid and therefore to be able to hold the pressure constant in particular is enabled by the arrangement according to FIG. 8 with the help of the throttling valve 28 or according to FIG. 13 with an opening 29 into open air, on which a throttling valve 28 can also be provided.

If the plastic melt is filled into the injection mold 4 and its cavity 6, as shown in FIGS. 9-12, via the auxiliary space 8, the melt displaced from the internal hollow space 3 of the component 2 with the help of gas and liquid can be fed back into the injection-molding machine via the auxiliary space or the other cavity 9 and through the inlet 7 of the melt.

For producing a plastic component 2 with an internal hollow space 3, in an injection mold 4 and its cavity 6, at first plastic is injection molded and then gas under pressure is injected into the still liquid plastic melt for displacing the plastic melt from the internal hollow space 3 to be formed, after which, for cooling the plastic, a cooling liquid is introduced into this internal hollow space 3. So that this cooling can be realized as quickly as possible, the gas is compressed with the help of the cooling liquid and inserted or injected into the plastic melt, so that the cooling liquid directly follows the gas, wherein it can be led already in the internal hollow space 3, before this is completed by the gas, i.e., gas and cooling liquid can be present simultaneously in the internal hollow space 3 to be formed.

The invention claimed is:

1. Method for producing a plastic component (2) with an internal hollow space (3), comprising injecting a first plastic melt into an injection mold (4), initially compressing a gas to an introduction pressure using a cooling liquid before being injected into the injection mold, and introducing the gas under the introduction pressure created by the cooling liquid into the plastic melt for displacing the plastic melt from the internal hollow space (3) to be formed, and then for cooling the plastic melt, introducing the cooling liquid into the internal hollow space (3).

2. Method according to claim 1, further comprising providing the gas in a pre-chamber of small cross section located in front of the injection mold (4) in a direction of flow, and bringing the gas to the introduction pressure by the cooling liquid prior to introduction into the injection mold (4) and the plastic melt located there.

3. Method according to claim 1, further comprising filling a measured amount of the gas under high pressure into a tubular or hose-like pre-chamber (11) connected to an injector (10) for introducing the gas and the cooling liquid into the injection mold (4), and supplying the cooling liquid to an end of the tubular or hose-like pre-chamber opposite the injector (10), which first brings the gas to the introduction pressure and compresses it, and then upon opening the injector (10), the supply of the cooling liquid is continued.

4. Method according to claim 1, wherein the plastic melt displaced in the interior of the plastic component (2) within the injection mold (4) from the internal hollow space (3) formed by the gas is fed and/or displaced into at least one auxiliary space (8) or into at least one auxiliary volume.

5. Method according to claim 1, wherein an amount of gas is set so that it partially fills in compressed form the hollow space formed by the gas in the injection mold (4) and the cooling liquid is fed into the hollow space (3), while the gas continues displacing the plastic melt.

6. Method according to claim 4, wherein the auxiliary space or spaces (8) are filled completely with the plastic melt and the gas and the cooling liquid remains in the internal hollow space (3) of the plastic component (2), or the auxiliary space or spaces (8) are filled partially with the plastic melt and partially with the gas or partially with the plastic melt, the gas, and the cooling liquid.

7. Method according to claim 4, wherein the auxiliary space or spaces (8) are used as additional injection molds (4) and are filled from the first injection mold outwards and/or via a separate filling opening with the plastic melt and then an internal hollow space is formed by the gas and the cooling liquid entering in the auxiliary space or spaces.

8. Method according to claim 1, wherein after filling the hollow space or spaces (3) with the cooling liquid, stopping the feeding device for the cooling liquid and discharging the cooling liquid through an inlet opening.

9. Method according to claim 1, wherein the gas comprises one of an inert gas, nitrogen, a non-inert gas, air, or a gas mixture.

10. Method according to claim 1, wherein the cooling liquid comprises water.

11. Method according to claim 4, further comprising filling the plastic melt by an inlet (7) directly into the injection mold (4), closing the connection to the auxiliary space (8), and after filling the injection mold with the plastic melt, opening the connection to the auxiliary space (8) and injecting the gas into the injection mold and/or at least partially also into the auxiliary space (8) using the cooling liquid to compress the gas.

12. Method according to claim 4, further comprising filling the cooling liquid up to the auxiliary space (8) or the auxiliary volume and then driving out the cooling liquid by a gas volume compressed therein.

13. Method according to claim 4, further comprising introducing gas for additional flushing and/or driving out of the cooling liquid from the hollow space (3) of the injection mold (4) into the auxiliary space (8).

14. Method according to claim 4, further comprising during a secondary flow of the cooling liquid bleeding off at least a portion of the gas from the auxiliary space (8) or auxiliary volume for maintaining a uniform or a reduced counter pressure.

15. Method according to claim 4, further comprising filling the plastic melt via the auxiliary space (8) or the auxiliary volume into the injection mold (4) and displacing the plastic melt from the internal hollow space (3) of the component (2) with the gas and the cooling liquid via the auxiliary space (8), and feeding the inlet (7) of the plastic melt back into the injection-molding machine.

* * * * *